Patented Feb. 25, 1936

2,031,632

UNITED STATES PATENT OFFICE 2,031,632

PROCESS FOR RECOVERING ACIDIC GASES FROM GASEOUS MIXTURES

Robert Roger Bottoms, Louisville, Ky., assignor to The Girdler Corporation, Louisville, Ky., a corporation of Delaware No Drawing. Application June 21, 1934, Serial No. 731,620

8 Claims. (Cl. 23—2)

The present invention relates to improvements in processes for separating and recovering acidic gases from gaseous mixtures, and it relates particularly to processes of the type disclosed and claimed in my Reissue Patent No. 18,958 and which utilize aqueous solutions of alkaline organic nitrogen compounds, which are caused to contact with such gaseous mixtures.

In said patent there is disclosed a process in which there is employed an aqueous solution of amino compounds, which are readily soluble or miscible with water, which have boiling points substantially above 100° C., which have negligible vapor pressures at and below 100° C., which will readily unite with weakly acidic gases at comparatively low temperature ranges, and which may be regenerated by heating so that the acidic gases will be substantially completely liberated and may be recovered. Such process may be employed very satisfactorily for the removal and recovery of carbon dioxid, hydrogen sulfide and sulfur dioxid from gas mixtures, even though these latter gases be contained in relatively small quantities in the gas mixture being treated.

Among the preferred aqueous solutions are those of mono-, di-, and triethanolamines, diaminopropanol and other similar amino, aminocarboxy or aminohydroxy compounds, preferably containing not more than 4 to 9 carbon atoms, and desirably of an aliphatic and/or alicyclic character, and, also, if alcohols, containing 1 to 4 primary, secondary and/or tertiary alcohol groups and 1 to 4 primary, secondary and/or tertiary amino groups.

It has been found, however, that certain of these amino compounds in aqeos solution, particularly those which contain a primary alcohol or carboxyl group, are susceptible to oxidation with resultant decomposition and loss in strength of the amino compounds.

This decomposition of the amino compound not only decreases the absorption power of the aqueous solution, but in addition results in the formation of compounds which cause, or increase the rate of, corrosion of the apparatus in which the absorption and regeneration operations are performed, particularly when such apparatus is composed in part or whole of iron and/or steel.

For example, it has been found that triethanolamine is slowly oxidized to N-di(2-hydroxyethyl)-glycine, while monoethanolamine is slowly oxidized to glycolic and oxalic acid.

It has been found that if the gaseous mixtures being treated contain large quantities of oxygen, or if they contain nitrogen oxids, formaldehyde or formic acid, the rate of decomposition of the amine is increased not only with the formation of corrosive decomposition products, as above pointed out, but often with the formation of gummy or tarry constitutents which deposit throughout the apparatus and cause considerable difficulty.

It has also been found that iron and steel, which are the most available materials of construction for the absorption and regenerating apparatus, appear to act as carriers or catalysts to enhance the oxidizing and/or decomposition of the amino compounds, when oxygen or other oxidizing gases are present in the gas mixtures being treated.

The main object of the present invention is to prevent such resultant oxidation and decomposition of the amines, to eliminate largely loss in absorption power and corrosion of the apparatus without in any way interfering with the normal operation or efficiency of the absorbent or the apparatus.

It has been found possible to accomplish this object most satisfactorily by the utilization of relatively small quantities of arsenic and/or vanadium compounds in the aqueous solution of the amine. As examples, it is possible to employ sodium or potassium arsenite, sodium or potassium vanadate, arsenious trioxid, arsenious trisulfide, sodium or potassium arsenate, organic arsonic acids such as ethyl arsonic acid, arsanilic acid, vanadium pentoxid, and the like compounds. It is not necessary that the compound employed be soluble to the extent of more than a trace.

I have found that the introduction of small quantities, for example 0.1% to 2% more or less, of such materials into the solution prevents decomposition and oxidation of the amine with resultant loss in absorption power and with resultant corrosion of the equipment through which the solution is circulated. The metalloid compounds act effectively where the absorbing agent is an amine or an alkali salt of amine acids or other amine absorbent agents which will react with the acidic gas to absorb the same at one temperature and still give up the acidic gas and revivify the absorbing agent at another temperature.

The above mentioned compounds may be present in varying proportions, but I prefer to use such compounds in a concentration of approximately 1%.

The apparatus which may be employed, and the general method of circulating the solution through the absorption and reactivation stages of the cycle and the temperature changing or controlling means may be substantially the same as described in my prior Reissue Patent No. 18,958 and my Patent 1,834,016.

The solution is passed downwardly through a column in countercurrent to the gaseous mixture containing the acidic gases to be removed, and the solution containing these gases is then caused to flow down through a reactivator in which the solution is heated and the gases are caused to be driven off. The freed solution from the reactivator is cooled and returned to the top of the absorber.

Although various different absorbing agents may be employed, as above noted, I prefer to employ an amino alcohol, such for example, as mono-, di- or triethanolamine, or diaminopropanol, and the like amino alcohols or alkali salts of amino acids, such for example, as glycine sodium salt, alanine sodium salt or lysine sodium salt, and the like sodium salts of amino acids which are readily soluble in water. It is understood that the potassium, ammonium and amine salts of the amino acids are to be considered as fully equivalent as the sodium salt. The arsenic and vanadium operate as decomposition inhibitors, particularly effectively with all such amino compounds.

I am not certain as to the exact nature of the action which takes place between the arsenic or vanadium compound and the materials of construction, but the arsenic and vanadium compounds appear to lessen the amount of decomposition and oxidation of the amino compound, and particularly seem to decrease the tendency of the iron and steel materials of construction to act as carriers and/or to catalyze the reaction of the amines with the oxygen or other oxidizing agents carried in the gas mixtures being treated. As previously pointed out, the presence of these arsenic and/or vanadium compounds, even though in relatively minute proportions, largely eliminates the loss of amine and also greatly decreases the corrosion of the apparatus employed.

Although in practice I ordinarily prefer to heat the solution containing the absorbed gas so as to separate the acidic gas as such and restore the absorbent to its original condition, I may, in the case of hydrogen sulfide, effect the reactivation by oxidation instead of by heating, in which case the absorbent is restored to its original form and free sulfur is liberated which may be filtered out instead of the hydrogen sulfide being driven off as a gas.

Having thus described my invention, what I claim as new and desire to secure by Letters Patent is:

1. In the process of separating acidic gases from gaseous mixtures containing the same by contacting such gases with an aqueous solution of a basic organic amino compound, the step of inhibiting decomposition of the amino compound and preventing corrosion of the apparatus by including in the aqueous solution a relatively small proportion of a compound selected from a group consisting of vanadium and arsenic compounds.

2. In the process of separating acidic gases from gaseous mixtures containing the same by contacting such gases with an aqueous solution of an alkaline organic amino compound, the step of inhibiting decomposition of the amino compound and preventing corrosion of the apparatus by including in the aqueous solution a relatively small proportion of an arsenic compound.

3. In the process of separating acidic gases from gaseous mixtures containing the same by contacting such gases with an aqueous solution of an alkaline organic amino compound, the step of inhibiting decomposition of the amino compound and preventing corrosion of the apparatus by including in the aqueous solution a relatively small proportion of vanadium.

4. In the process of treating a gaseous mixture including carbon dioxide and hydrogen sulfide to remove said acidic constituents therefrom, said process including circulating a water solution of an amino alcohol in contact with said gas, to absorb the carbon dioxide and hydrogen sulfide, and then subsequently heating the solution after such absorption to remove the absorbed gases, the step of preventing decomposition of the amino alcohol and resultant corrosion of the apparatus by including in the water solution a relatively small quantity of a compound selected from the group of compounds including arsenic compounds and vanadium compounds, the amount of such compounds being not materially in excess of 1%.

5. The process of separating hydrogen sulfide and carbon dioxid from gaseous mixtures which includes subjecting said mixture to the action of a solution of an ethanolamine and a vanadium compound as an absorbent.

6. The process of separating hydrogen sulfide and carbon dioxid from gaseous mixtures which includes subjecting said mixture to the action of a solution of an ethanolamine and an arsenic compound as an absorbent.

7. An absorbent solution for separating acidic gases from gaseous mixtures containing the same, which comprises an aqueous solution of an absorbent agent selected from the group including mono-, di-, and triethanolamine, diaminopropanol, glycine sodium salt, alanine sodium salt, and lysine sodium salt, said solution also containing a relatively small quantity of an inhibitor not materially in excess of 1% selected from the group consisting of sodium and potassium arsenite, vanadate, and arsenate, arsenious trioxid and trisulfide, vanadium pentoxid, ethylarsonic acid, and arsanilic acid.

8. The process of separating carbon dioxid from gaseous mixtures, which includes subjecting said mixture to the action of a water solution of a basic organic amino compound and a relatively small quantity of a compound selected from the group of compounds including arsenic compounds and vanadium compounds.

ROBERT ROGER BOTTOMS.